United States Patent [19]

Taggart et al.

[11] Patent Number: 5,740,197

[45] Date of Patent: Apr. 14, 1998

[54] COOLED PROBE FOR USE IN HIGH TEMPERATURE PROCESS VESSELS

[75] Inventors: George W. Taggart, deceased, late of Dallas, Tex., by Carole Taggart; Lory Johnson, Oklahoma City, Okla.; Orville C. Ungerer, Dallas; F. Ellis Vandiver, Plano, both of Tex.

[73] Assignee: Koch Enterprises, Inc., Wichita, Kans.

[21] Appl. No.: 506,275

[22] Filed: Aug. 18, 1995

[51] Int. Cl.$^6$ .................................................. G01K 1/12
[52] U.S. Cl. ...................... 374/148; 374/208; 73/866.5; 165/163
[58] Field of Search .................................. 374/147, 148, 374/208, 179; 136/230, 231, 232, 233, 234; 73/866.5; 165/163

[56] References Cited

U.S. PATENT DOCUMENTS

| | | | |
|---|---|---|---|
| 1,139,549 | 5/1915 | Lovekin | 165/163 |
| 3,167,956 | 2/1965 | Grey | 374/148 X |
| 4,318,441 | 3/1982 | Belleli | 165/163 X |

*Primary Examiner*—George M. Dombroske
*Assistant Examiner*—Joseph L. Felber
*Attorney, Agent, or Firm*—Winstead Sechrest & Minick, P.C.; Gregory W. Carr

[57] ABSTRACT

An apparatus for inspecting, monitoring or injecting a process material into a high temperature process vessel includes a lance having an outer annulus, an inner annulus and a plurality of tubes positioned between inner annulus and outer annulus, the inner annulus defines a center passage, the tubes communicating with the cooling medium inlet for the flow of cooling medium to the distal end of the lance, the outer annulus, inner annulus and plurality of tubes defining a plurality of interspacial areas for the flow of cooling medium from the distal end of the lance to the cooling outlet. A thermocouple may mounted inside a thermocouple well for measuring the temperature adjacent the distal end of the injection lance.

37 Claims, 7 Drawing Sheets

COOLED PROBE FOR USE IN HIGH TEMPERATURE PROCESS VESSELS

TECHNICAL FIELD

This invention relates to a novel cooled probe useful in processes where it is necessary or desirable to inject material into a hot process, sample gases present in the process or view the interior of process equipment at locations where considerations of temperature or other factors prevent observation of the equipment through an open porthole or observation element.

BACKGROUND OF THE INVENTION

In numerous chemical processes it is desirable, if not required, to be able to inject various gases into the process equipment at selected locations. In some applications it may be desirable to inject an oxidizing agent into a thermal reactor operating at extreme temperatures. In other applications it may be necessary to view the interior of process equipment that is subjected to extreme temperatures, for example the interior of a burner or boiler. In such applications, due to concerns related to the process temperature, pressure and content of the process equipment, it may not be feasible to view or inspect the process equipment through an observation element that is open or opens to atmosphere. For example, a process vessel under positive pressure and containing an extremely hot or toxic material could not, under most circumstances, readily be opened to atmosphere to permit inspection through an open observation port.

In other applications it may be necessary or desirable to insert sensors, such as a thermocouple, or samplers into the interior of a process vessel to monitor process temperatures or the composition of material in the vessel for process control purposes. In the case of a process vessel operating at high temperatures, the temperatures present in the vessel could destroy conventional sensors or samplers. Consequently there exists a need for an apparatus for injecting material into a process vessel under extreme temperatures, for permitting inspection of the interior of process vessels under extreme temperatures and for protecting sensors and samplers in such vessels.

SUMMARY OF THE INVENTION

The present invention provides an apparatus comprising an improved cooled probe for injecting material into a process vessel under extreme temperatures, for permitting inspection of the interior of process vessels under extreme temperatures and for protecting sensors and samplers in such vessels. The improved cooled probe includes a cooling medium inlet and outlet, a purge medium inlet and a cooled lance. The lance includes an outer annulus, an inner annulus and a plurality of tubes positioned between the outer annulus and the inner annulus. A cooling medium inlet communicates with the tubes to provide for the flow of cooling medium through the tubes to the distal end of the lance. The cooling medium returns to a cooling medium outlet located adjacent to the cooling medium inlet though interspacial areas between adjacent tubes.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Referring now to the drawings where like reference characters designate like or similar parts throughout, and specifically to FIGS. 1, 1(a), 2 and 3, a first embodiment of the cooled probe 10 of the present invention is illustrated. Cooled probe 10 includes an inlet 12, a cooling medium inlet 14, a cooling medium outlet 16 and a purge medium inlet 18. In the event that the cooled probe 10 is out of service, a purge medium such as air or nitrogen may be supplied to prevent process materials from entering the probe 10.

Figure 1:
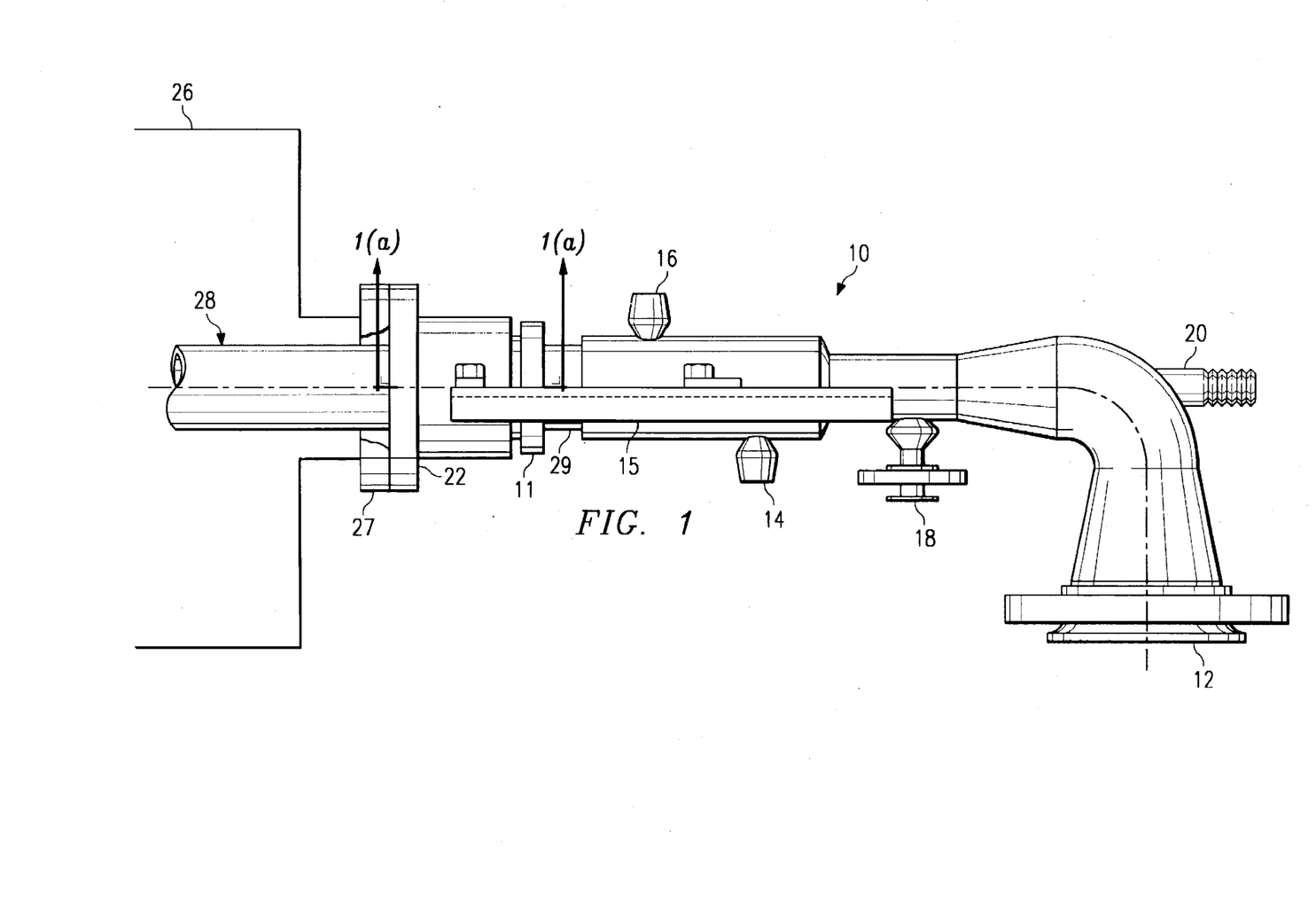
FIG. 1 is a partial side view of a cooled probe of the present invention.
Figure 1A:
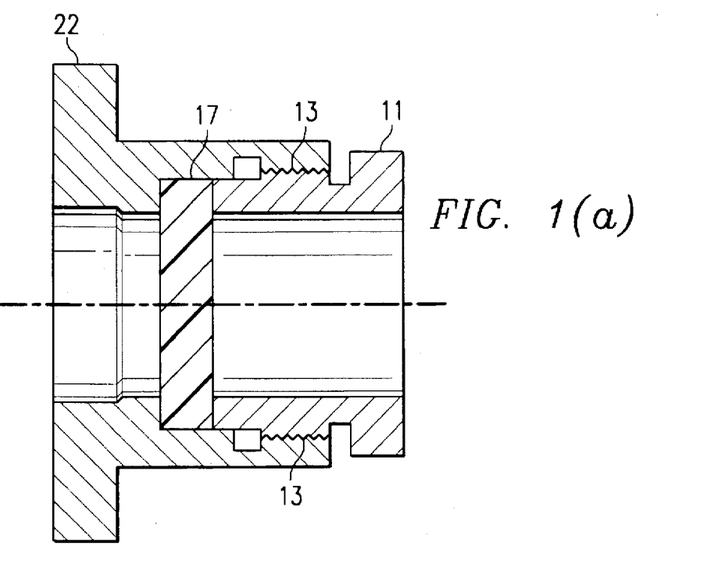
FIG. 1(a) is a partial cross sectional view along line 1(a)—1(a) of FIG. 1.
Figure 2:
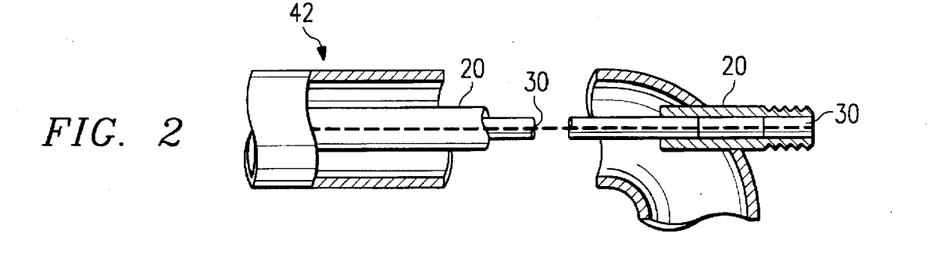
FIG. 2 is a partial cross section of the cooled probe of the present invention.
Figure 3:
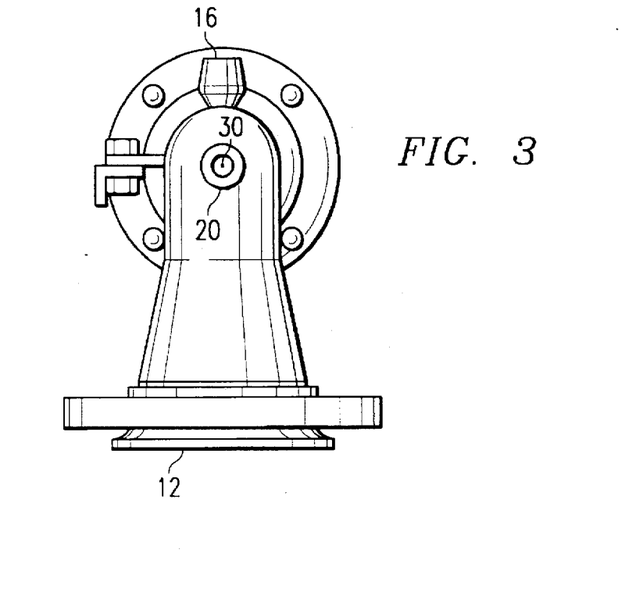
FIG. 3 a partial perspective view of an embodiment of a cooled probe of the present invention.

In one embodiment, cooled probe 10 may include a thermocouple well 20 that extends axially down the interior of the probe 10 to the distal end 42 of the lance 28. Flanged collar 22 is provided for mounting to an exterior flanged opening 27 of process vessel 26. A mating member 11 is provided for mounting flanged collar 22. As best illustrated in FIG. 1(a), flanged collar 22 is attached to mating member 11 at 13 with a threaded and bolted connection. A packing member 17 is interposed between mating member 11 and flanged collar 22 for sealing purposes. Referring once again to FIG. 1, a retaining bar 15 is employed to secure flanged collar 22 to probe 10.

Lance 28 extends into the interior of process vessel 26 for process monitoring or injection of material to the preferred location in the vessel. A thermocouple 30 may be inserted into and mounted within thermocouple well 20 for monitoring temperatures.

Referring now to FIGS. 1, 4, 4(a), 5, 5(a) and 9 the construction and operation of the cooled probe 10 will be described in greater detail. Cooled probe 10 includes a lance 28 for insertion into a process vessel 26. The lance 28 may be used, for example, to inject a gaseous oxidizing agent into a steel furnace or reactor and/or to monitor the reactor temperature. The lance 28 includes a proximate end 29 and a distal end 42. Lance includes an outer annulus or shell 32, an inner annulus or shell 34 and a series of tubes 36 concentrically arranged between the outer annulus 32 and inner annulus 34. As illustrated, tubes 36 are positioned in equal spaced relationship around the circumference of inner annulus 34 and define interspacial areas 40 between the tubes 36, the inner annulus 34 and outer annulus 32. Inner annulus 34 defines a center annular passage 35. Center annular passage 35 communicates with inlet 12 for the flow of a process medium through lance 28 into the process vessel 26.

A cooling medium such as water or steam is injected into cooled probe 10 through cooling medium inlet Cooling medium inlet 14 communicates with tubes 36 for the flow of cooling medium through tubes 36 down the length of lance 28. Tubes 36 pass through bulkhead and spacer 38 which is positioned between cooling medium inlet 14 and cooling medium outlet 16. Bulkhead and spacer 38 serves to direct the flow of cooling medium down tubes 36 and prevent the cooling medium entering the cooled probe 10 from flowing into the interspacial areas 40 between the individual tubes 36 where the cooling medium flows in its return path to cooling medium outlet 16. Bulkhead and spacer 38 also serves to maintain the tubes 36 in equally spaced apart relationship between the inner and outer annulus.

At the distal end 42 of lance 28 tubes 36 terminate in an annular chamber 44 defined by outer annulus 32, inner annulus 34 and outlet collar 46. Cooling medium which has flowed down the length of lance 28 enters annular chamber 44 which communicates with interspacial areas 40 for the flow of cooling medium through interspacial areas 40 to cooling medium outlet 16.

Figure 4:
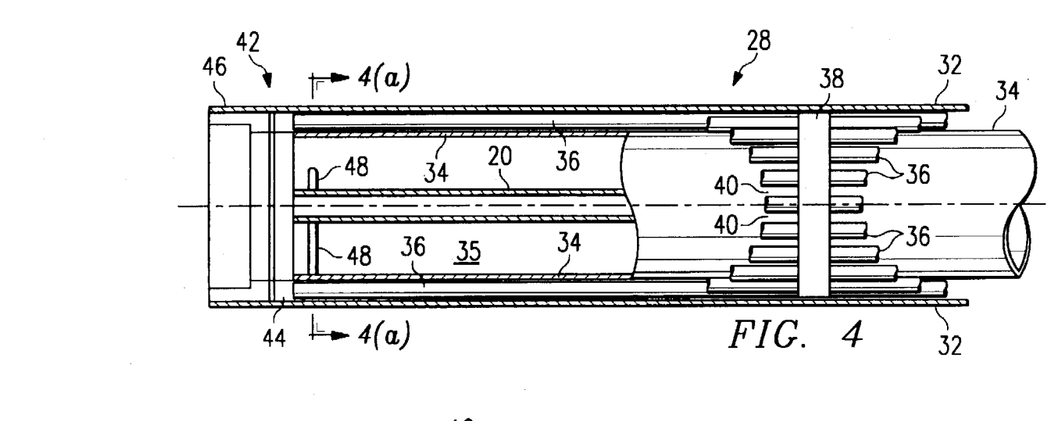
FIG. 4 is a partial cross-sectional view of the terminal portion of the cooled probe of the present invention.
Figure 4A:
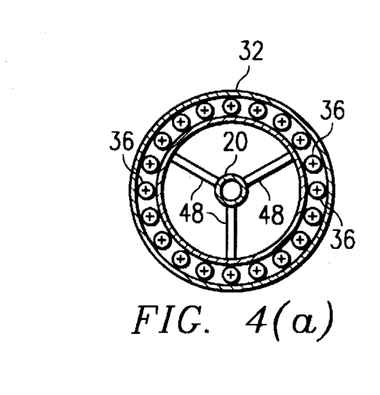
FIG. 4(a) is a cross sectional view along line 4(a) —4(a) of FIG. 4.
Figure 5:
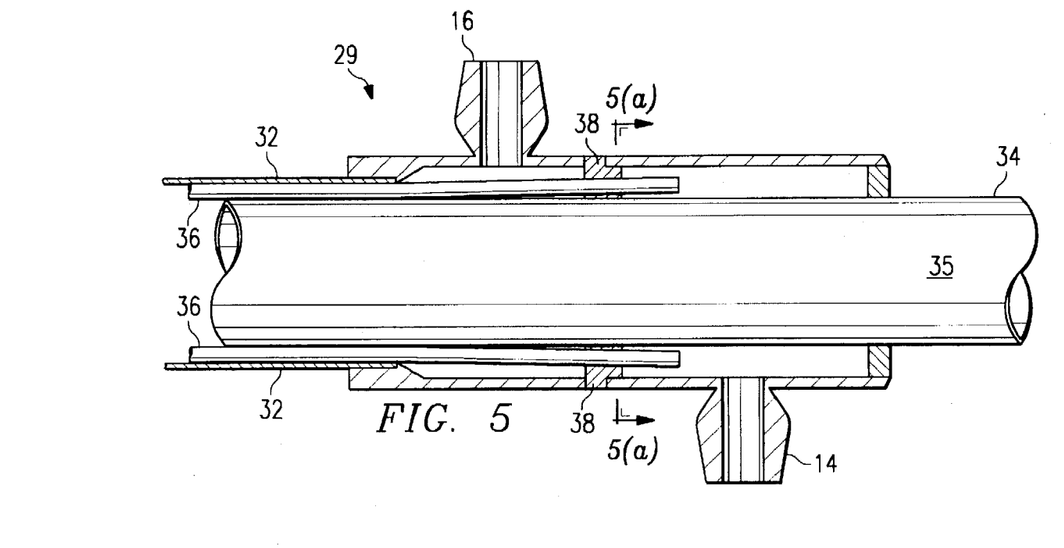
FIG. 5 is a second partial cross section of the cooled probe of FIG. 1.
Figure 5A:
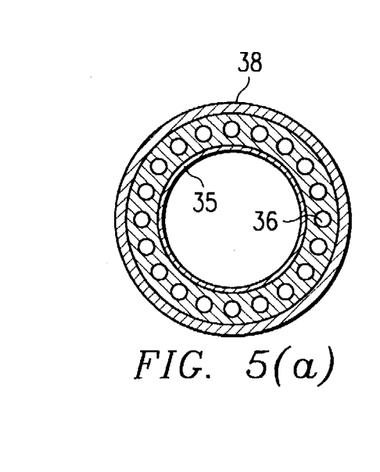
FIG. 5(a) is a cross sectional view along line 5(a)—5(a) of FIG. 5.

As best illustrated by FIGS. 4 and 4(a), the distal end of lance 28 includes thermocouple support members 48 for supporting thermocouple well 20 in the center of annular passage 35. In some applications the length and temperature service of the thermocouple well 20 may tend to cause thermocouple well 20 to sag or warp and contact the inner annulus 34 of lance 28, thereby potentially distorting the accuracy of temperature readings taken from thermocouple 30. If thermocouple 30 is used to provide temperature readings for the purpose of regulating the flow of cooling medium supplied to the cooled probe 10, contact between the thermocouple well 20 and inner annulus 34 could result in inaccurate temperature readings and equipment damage due to insufficient cooling medium flow. Similarly, if the temperature reading from thermocouple 30 is used to trigger a shutdown in the event of an under or over temperature reading, an inaccurate temperature reading from the thermocouple 30 could result in unnecessary shutdowns of the unit and/or equipment damage.

Thermocouple support members 48 are each connected to thermocouple well 20 and extend outwardly for connection to inner annulus 34. In the illustrated embodiment, three thermocouple support members are positioned at 60° intervals around the circumference of thermocouple well 20. The support members 48 serve to maintain the thermocouple well 20 at the approximate center of the annular passage 35 near the distal end 42 of lance 28 and prevent the thermocouple well from contacting inner annulus 34 of lance 28, thus assuring that the accuracy of the temperature reading obtained from thermocouple 30 is not affected by contact with the inner annulus 34.

Figure 9:
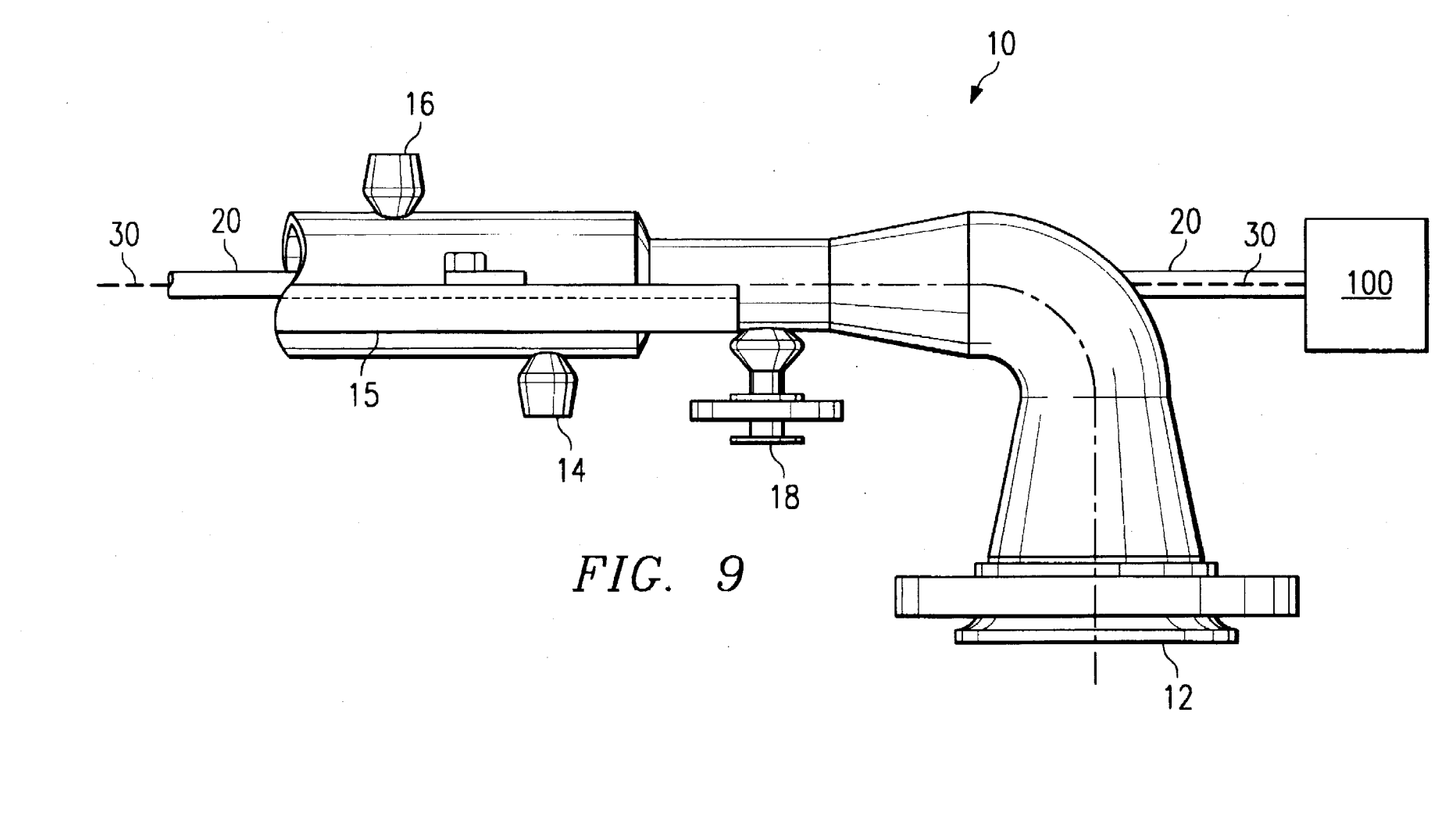
FIG. 9 is a partial side view of an alternate embodiment of the cooled probe of FIGS. 1–5 of the present invention equipped with a reciprocating mechanism for movement of a thermocouple.

Referring now to FIG. 9 the improved cooled probe is equipped with a mechanism 100 for reciprocating movement of thermocouple 30 into the process vessel for monitoring temperatures at different locations without continuous exposure of the thermocouple to the process conditions in the vessel. The mechanism 100 may be automatic or manual and may comprise any conventional mechanism for reciprocating movement such as a rack and pinion drive or a fluid actuated cylinder. Mechanism 100 permits monitoring of temperatures within the process vessel at different locations without continuous exposure of the thermocouple which could possibly destroy the thermocouple in a short period.

Figure 6:
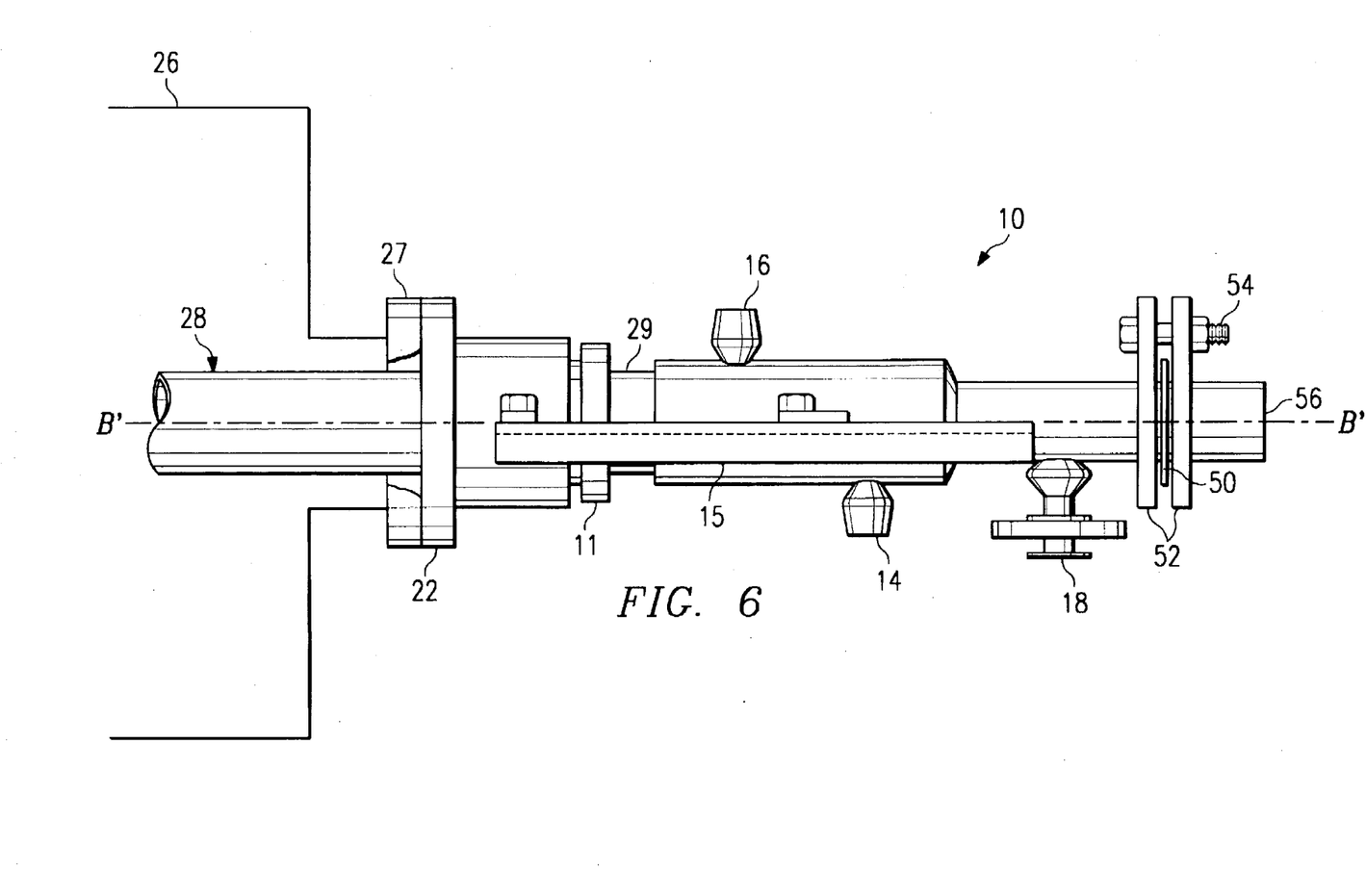
FIG. 6 is a partial side view of an alternate embodiment of the cooled probe of the present invention equipped with a sight glass.

Referring now to FIG. 6, an alternate embodiment of the present invention is illustrated. As illustrated, cooled probe 10 is equipped with a sight glass 50 which is positioned between flanges 52. Flanges 52 may be of the slip-on type, depending upon the application, and are secured together with bolts 54. An observation port 56 is provided to permit visual observation of the interior of a process vessel along axis B—B. A purge medium such as air, nitrogen or steam is provided through purge inlet 18 to prevent process gases and other materials from contacting or condensing on the interior surface of sight glass 50. The cooled probe of FIG. 6 may be permanently or temporarily mounted on process vessel 26 for visual inspection of one or more locations in the interior of the vessel as desired. The cooled probe of FIG. 6 may also be equipped with a thermocouple as illustrated in FIGS. 1–5 and described above.

Figure 7:
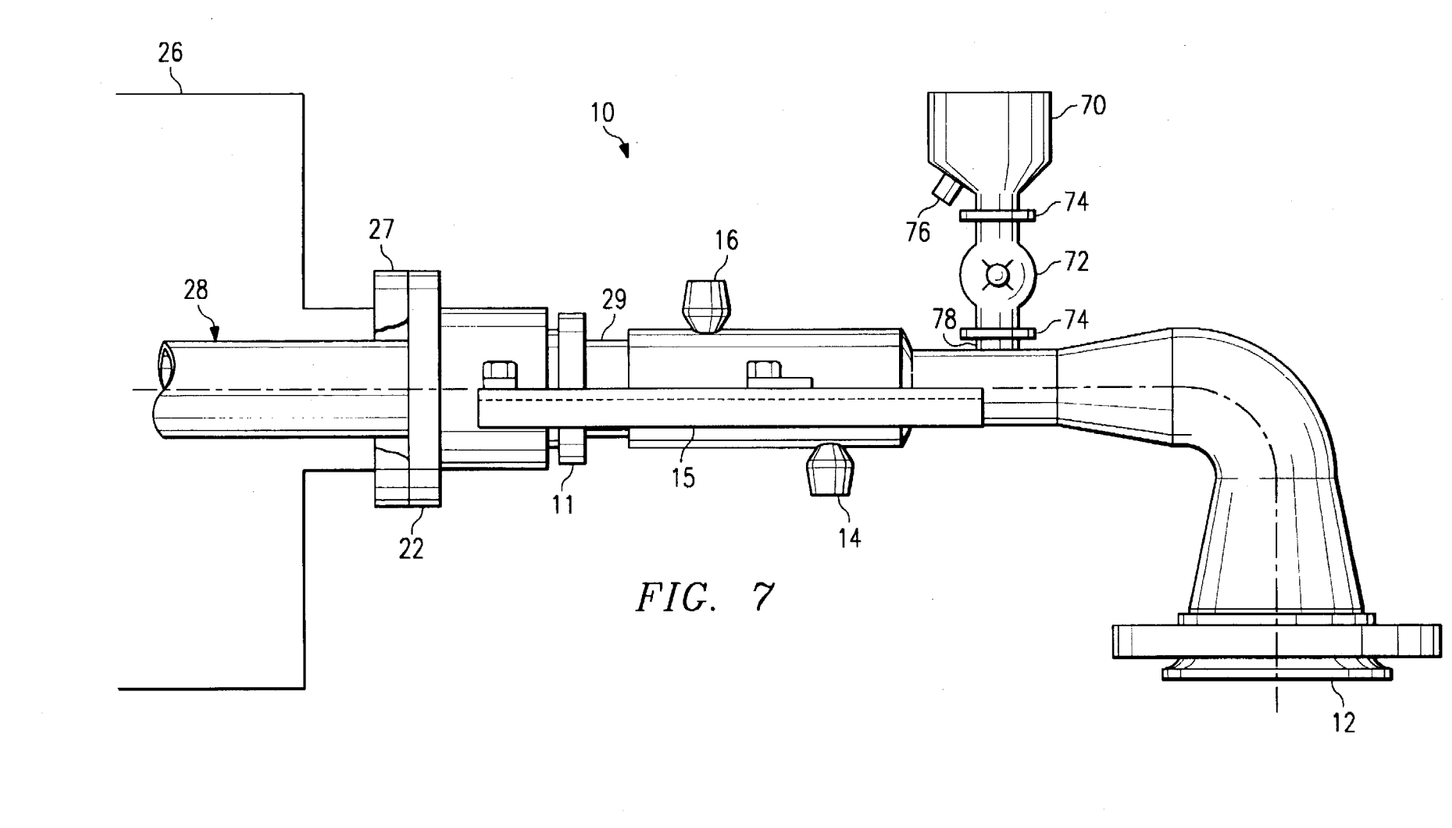
FIG. 7 is a partial side view of a second alternate embodiment of the cooled probe of the present invention equipped with a rotary feeder.

Referring now to FIG. 7, another alternate embodiment of the present invention is illustrated. In the embodiment illustrated in FIG. 7, cooled probe 10 comprises an apparatus for injecting a powder or granular material into process vessel 26. As illustrated, cooled probe 10 includes a hopper 70 for supplying a powder or granular material through rotary feeder 72. Hopper 70 may be equipped with a vibrator or air cannon 76 to facilitate the flow of powder or granular material to rotary feeder 72. Rotary feeder 72 may be equipped with a constant or variable speed drive (not shown), depending upon the application. Slide gates or valves 74 are provided to isolate the rotary feeder 72 from the hopper 70 and inlet 78. A transport medium such as air, steam or nitrogen is supplied through inlet 12 to fluidize and convey a powder or granular material entering the cooled probe through inlet 78. The rate of flow of the transport medium may be varied depending upon the rate of operation of rotary feeder 72 and other process conditions. The cooled probe of FIG. 7 may also be equipped with a thermocouple as described and illustrated in connection with FIGS. 1–5.

Figure 8:
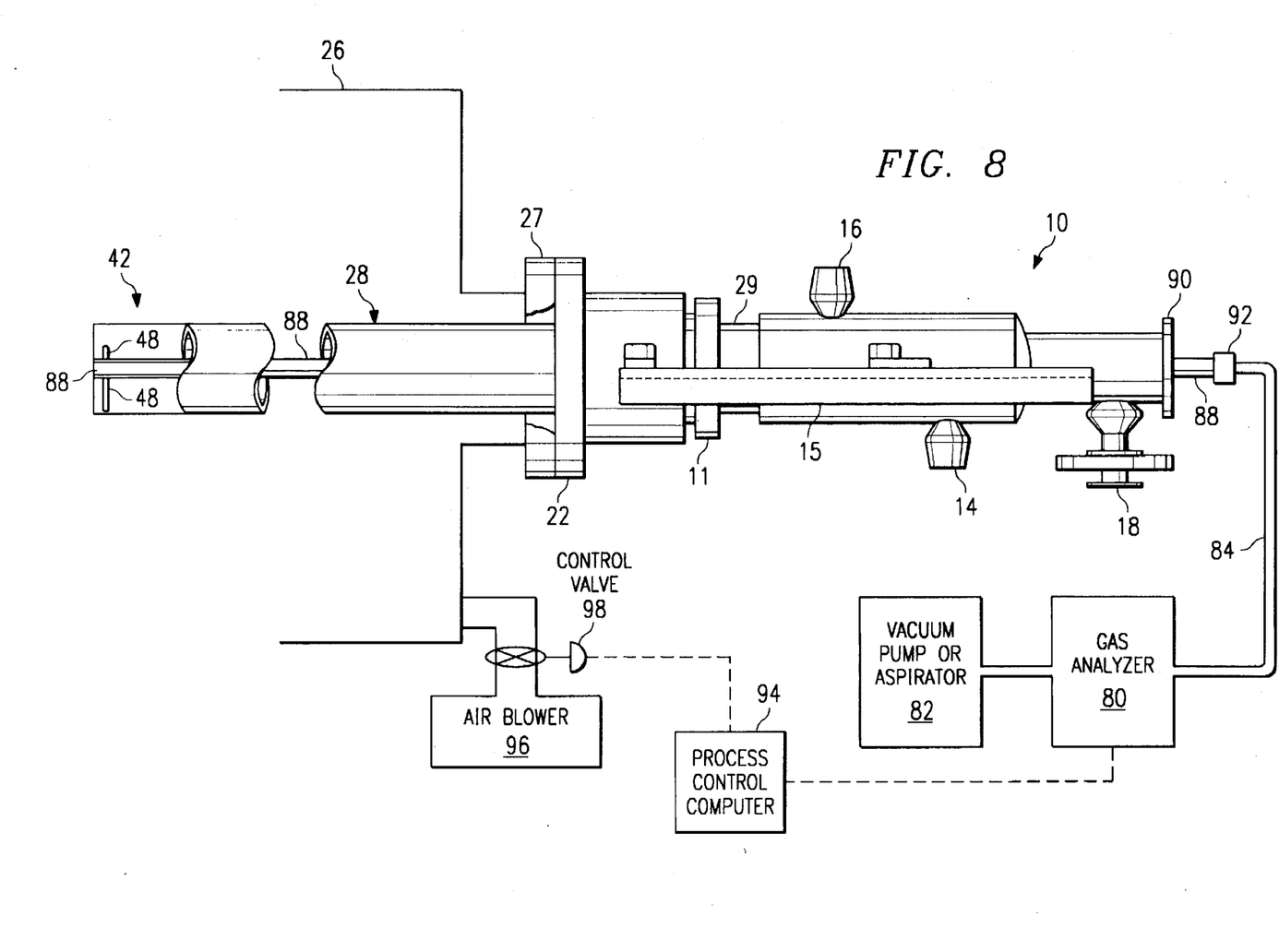
FIG. 8 is a partial side view of a third alternate embodiment of the cooled probe of the present invention equipped with a sampling tube.

Referring now to FIG. 8, yet another alternate embodiment of the present invention is illustrated. A sampling tube 88 extends through cooling probe 10 and lance 28 to the distal end of lance 28 in the interior of process vessel 26. Depending on process parameters and conditions, the tube 88 may be fabricated from different materials. In many applications sampling tube 88 may be stainless steel or other corrosion resistant material. It is conceivable that some applications may present conditions under which glass or ceramic tubes may be required due to process materials or temperatures. As illustrated, sampling tube 88 extends through blind flange 90 to the distal end of lance 28. Sampling tube 88 may be provided with supports 48 as described above in connection with FIGS. 4 and 4(a) depending upon the length of the sampling tube 88, the material used to fabricate the tube and the process conditions. Sampling tube 88 is connected to a sample line 84 adjacent to blind flange 90 with coupling 92. Sampling line 84 extends to and is connected to gas analyzer 80. Gas analyzer 80 may be of any type, such as a flue gas analyzer, an oxygen monitor or a gas chromatograph. Analyzer 80 may be optionally equipped with a vacuum pump or aspirator 82 for applications where the process vessel 26 is under negative pressure. In one embodiment of the present invention, process vessel 26 comprises a furnace or kiln and gas analyzer 80 comprises an oxygen monitor for controlling the flow of combustion air to the furnace. In this embodiment, a signal from gas analyzer 80 representing the amount of oxygen in the flue gas exiting the kiln is transmitted to process control computer 94 which in turn transmits a signal to control valve 98 to regulate the flow of air supplied to the kiln by combustion air blower 96. The cooled probe of FIG. 8 may also be equipped with a sight glass and/or thermocouple as described and illustrated in connection with FIGS. 1–6. While the present invention has been disclosed and discussed in connection with the foregoing embodiments, it will be understood that the invention is not limited to the embodiments disclosed, but is capable of numerous rearrangements, modifications, and substitutions of parts and elements without departing from the spirit and scope of the invention.

We claim:

1. A cooled probe, comprising:
   a cooling medium inlet;
   a cooling medium outlet;
   a lance comprising an outer annulus and an inner annulus;
   a plurality of tubes positioned between the inner annulus and the outer annulus, the inner annulus defining a center passage;
   the tubes communicating with the cooling medium inlet for the flow of cooling medium to the distal end of the lance; and
   a plurality of interspacial areas defined by the outer annulus, inner annulus and plurality of tubes for directing the flow of cooling medium from the tubes at the distal end of the lance to the cooling medium outlet.

2. The apparatus of claim 1 further comprising a purge inlet, the purge inlet communicating with the center passage for the flow of a purge medium.

3. The apparatus of claim 1 further comprising a thermocouple for measuring the temperature adjacent the distal end of the lance.

4. The apparatus of claim 3 further comprising a thermocouple well for mounting the thermocouple within the lance.

5. The apparatus of claim 4 further comprising a plurality of thermocouple supports for supporting the thermocouple well within the inner annulus of the lance.

6. The apparatus of claim 5 further comprising means for reciprocating movement of the thermocouple into the process vessel for measuring temperatures in the process vessel at different locations.

7. The apparatus of claim 3 further comprising means for reciprocating movement of the thermocouple into the process vessel for measuring temperatures in the process vessel at different locations.

8. The cooled probe of claim 3 further comprising a material inlet in fluid communication with the central passage for flow of material.

9. The cooled probe of claim 3 further comprising a purge inlet, the purge inlet communicating with the center passage for the flow of a purge medium.

10. The apparatus of claim 1 further comprising an outlet collar, the outlet collar, inner annulus and outer annulus defining an annular chamber, said tubes communicating with said annular chamber for the flow of cooling medium through the interspacial areas to the cooling medium outlet.

11. The cooled probe of claim 1 further comprising a bulkhead positioned between the inner annulus and the outer annulus for directing the cooling medium into the tubes and for preventing the cooling medium entering the cooling medium inlet from flowing into the interspacial areas until the cooling medium reaches the distal end of the lance.

12. The cooled probe of claim 11 further comprising an outlet collar, the outlet collar, inner annulus and outer annulus defining an annular chamber, said tubes communicating with said annular chamber for the flow of cooling medium through the interspacial areas to the cooling medium outlet.

13. The cooled probe of claim 12 further comprising a thermocouple for measuring the temperature adjacent the distal end of the lance.

14. An apparatus for injection of a process material into a vessel comprising:
    a lance comprising an outer annulus and an inner annulus defining a central passage;
    a cooling medium inlet in fluid communication with the outer annulus;
    a cooling medium outlet in fluid communication with the outer annulus;
    a material inlet in fluid communication with the central passage for the flow of material;
    a plurality of tubes positioned between the inner annulus and the outer annulus;
    the tubes communicating with the cooling medium inlet for the flow of cooling medium to the distal end of the lance; and
    a plurality of interspacial areas in fluid communications with the cooling medium outlet, the plurality of interspacial areas defined by the outer annulus, inner annulus and plurality of tubes for directing the flow of cooling medium from the tubes at the distal end of the lance to the cooling medium outlet.

15. The apparatus of claim 14 further comprising a purge inlet, the purge inlet communicating with the center passage for the flow of a purge medium.

16. The apparatus of claim 8 further comprising a thermocouple for measuring the temperature adjacent the distal end of the lance and a thermocouple well for mounting the thermocouple within the lance.

17. The apparatus of claim 16 further comprising a plurality of thermocouple supports for supporting the thermocouple well within the inner annulus of the lance.

18. The apparatus of claim 14 further comprising an outlet collar, the outlet collar, inner annulus and outer annulus defining an annular chamber, said tubes communicating with said annular chamber for the flow of cooling medium through the interspacial areas to the cooling medium outlet.

19. An apparatus for inspecting the interior of a process vessel comprising:
    a lance comprising an outer annulus and an inner annulus, the inner annulus defining a central passage;
    a sight glass connected to the lance for viewing through the central passage;
    a cooling medium inlet in fluid communication with the outer annulus;
    a cooling medium outlet in fluid communication with the outer annulus;
    a plurality of tubes positioned between the inner annulus and the outer annulus;
    the tubes communicating with the cooling medium inlet for the flow of cooling medium to the distal end of the lance; and
    a plurality of interspacial areas in fluid communication with the cooling medium outlet, the plurality of interspacial areas defined by the outer annulus, inner annulus and plurality of tubes for directing the flow of cooling medium outlet from the table at the distal end of the lance to the cooling medium outlet.

20. The apparatus of claim 19 further comprising a purge inlet, the purge inlet communicating with the center passage for the flow of a purge medium.

21. The apparatus of claim 19 further comprising a thermocouple for measuring the temperature adjacent the distal end of the lance.

22. The apparatus of claim 21 further comprising a thermocouple well for mounting the thermocouple within the lance.

23. The apparatus of claim 22 further comprising a plurality of thermocouple supports for supporting the thermocouple well within the inner annulus of the lance.

24. The apparatus for inspecting the interior of a process vessel of claim 21 further comprising means for reciprocating movement of the thermocouple into the process vessel for measuring temperatures in the process vessel at different locations.

25. The apparatus for inspecting the interior of a process vessel of claim 19 further comprising an outlet collar, the outlet collar, inner annulus and outer annulus defining an annular chamber, the tubes communicating with said annular chamber for the flow of cooling medium through the interspacial area to the cooling medium outlet.

26. The apparatus for inspecting the interior of a process vessel of claim 19 further comprising a bulkhead positioned between the inner annulus and the outer annulus for directing the cooling medium into the tubes and for preventing the cooling medium entering the cooling medium inlet from flowing into the interspacial areas until the cooling medium reaches the distal end of the lance.

27. An apparatus for monitoring the temperature of a process vessel comprising:
a lance comprising an outer annulus and an inner annulus, the inner annulus defining a central passage;
a cooling medium inlet in fluid communication with the outer annulus;
a cooling medium outlet in fluid communication with the outer annulus;
a material inlet in fluid communication with the central passage for the flow of material;
a plurality of tubes positioned between the inner annulus and the outer annulus;
the tubes communicating with the cooling medium inlet for the flow of cooling medium to the distal end of the lance; and
a plurality of interspacial areas in fluid communication with the cooling medium outlet, the plurality of interspacial areas defined by the outer annulus, inner annulus and plurality of tubes for directing the flow of cooling medium from the tubes at the distal end of the lance to the cooling medium outlet;
a thermocouple positioned in the center passage for measuring the temperature adjacent the distal end of the lance; and
a thermocouple well for mounting the thermocouple within the lance.

28. The apparatus of claim 27 further comprising a purge inlet, the purge inlet communicating with the center passage for the flow of a purge medium and a bulkhead positioned between the inner annulus and the outer annulus for directing the cooling medium into the tubes and for preventing the cooling medium entering the cooling medium inlet from flowing into the interspacial areas until the cooling medium reaches the distal end of the lance.

29. The apparatus of claim 28 further comprising a plurality of thermocouple supports for supporting the thermocouple well within the inner annulus of the lance and an outlet collar, the outlet collar, inner annulus and outer annulus defining an annular chamber, said tubes communicating with said annular chamber for the flow of cooling medium through the interspacial areas to the cooling, medium outlet.

30. An apparatus for injection of a powder or granular material into a vessel comprising:
a lance comprising an outer annulus and an inner annulus, the inner annulus defining a central passage;
a cooling medium inlet in fluid communication with the outer annulus;
a cooling medium outlet in fluid communication with the outer annulus;
a plurality of tubes positioned between the inner annulus and the outer annulus;
the tubes communicating with the cooling medium inlet for the flow of cooling medium to the distal end of the lance;
a plurality of interspacial areas in fluid communication with the cooling medium outlet, the plurality of interspacial areas defined by the outer annulus, inner annulus and plurality of tubes for directing the flow of cooling medium from the tubes at the distal end of the lance to the cooling medium outlet; and
a hopper in fluid communication with the central passage for supplying a powder or granular material into the vessel.

31. The apparatus of claim 30 further comprising a material inlet in fluid communication with the central passage for injection of a flow of material.

32. The apparatus of claim 31, further comprising means in the hopper for supplying powder or granular material into the vessel.

33. The apparatus of claim 30 further comprising a feeder means mounted in the hopper for supplying powder or granular material into the vessel.

34. The apparatus of claim 30 further comprising a thermocouple for measuring the temperature adjacent the distal end of the lance.

35. An apparatus for sampling gases in a process vessel comprising:
a lance comprising an outer annulus and an inner annulus, the inner annulus defining a central passage;
a cooling medium inlet in fluid communication with the outer annulus;
a cooling medium outlet in fluid communication with the outer annulus;
a plurality of tubes positioned between the inner annulus and the outer annulus;
the tubes communicating with the cooling medium inlet for the flow of cooling medium to the distal end of the lance;
a plurality of interspacial areas in fluid communication with the cooling medium outlet, the plurality of interspacial areas defined by the outer annulus, inner annulus and plurality of tubes for directing the flow of cooling medium from the tubes at the distal end of the lance to the cooling medium outlet; and
a sampling tube extending through the central passage to the distal end of the lance for sampling gases present in the vessel.

36. The apparatus of claim 35, further comprising a purge inlet in fluid communication with the center passage for the flow of a purge medium.

37. The apparatus of claim 35 further comprising an outlet collar, the outlet collar, inner annulus and outer annulus defining an annular chamber, said tubes communicating with said annular chamber for the flow of cooling medium through the interspacial areas to the cooling medium outlet and a bulkhead positioned between the inner annulus and the outer annulus for directing the cooling medium into the tubes and for preventing the cooling medium entering the cooling medium inlet from flowing into the interspacial areas until the cooling medium reaches the distal end of the lance.

* * * * *